US011904482B2

United States Patent
Jiang et al.

(10) Patent No.: US 11,904,482 B2
(45) Date of Patent: Feb. 20, 2024

(54) MECHANICAL ARM CALIBRATION SYSTEM AND MECHANICAL ARM CALIBRATION METHOD

(71) Applicant: Industrial Technology Research Institute, Hsinchu (TW)

(72) Inventors: Jun-Yi Jiang, Nantou County (TW); Yen-Cheng Chen, Taichung (TW); Chung-Yin Chang, Taichung (TW); Guan-Wei Su, Tainan (TW); Qi-Zheng Yang, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 295 days.

(21) Appl. No.: 17/219,890

(22) Filed: Apr. 1, 2021

(65) Prior Publication Data
US 2022/0203544 A1    Jun. 30, 2022

(30) Foreign Application Priority Data

Dec. 28, 2020   (TW) .................. 109146442

(51) Int. Cl.
    *B25J 9/16*       (2006.01)
    *B25J 19/00*     (2006.01)

(52) U.S. Cl.
    CPC ........... *B25J 9/1692* (2013.01); *B25J 9/1602* (2013.01); *B25J 9/1653* (2013.01); *B25J 9/1664* (2013.01); *B25J 9/1684* (2013.01); *B25J 19/0095* (2013.01)

(58) Field of Classification Search
    CPC ...... B25J 9/1692; B25J 9/1602; B25J 9/1653; B25J 9/1664; B25J 9/1684; B25J 19/0095; G05B 2219/39024
See application file for complete search history.

(56) References Cited

U.S. PATENT DOCUMENTS 4,763,276 A     8/1988   Perreirra et al.
7,636,700 B2 *   12/2009   Owechko ............ G06F 18/2111
                                                            382/173

(Continued)

FOREIGN PATENT DOCUMENTS

CN         102725712      10/2012
CN         103033186       4/2013

(Continued)

OTHER PUBLICATIONS

Hung-Yang Chen,"A Study of Industrial Robot Calibration Using Leap Motion Sensor", Thesis of Master Degree, NCHU, Jul. 2015, pp. 1-141.

(Continued)

*Primary Examiner* — Abby Y Lin
*Assistant Examiner* — Dylan M Katz
(74) *Attorney, Agent, or Firm* — JCIPRNET

(57) ABSTRACT

A mechanical arm calibration system and a mechanical arm calibration method are provided. The method includes: locating a position of an end point of a mechanical arm in a three-dimensional space to calculate an actual motion trajectory of the end point when the mechanical arm is operating; retrieving link parameters of the mechanical arm, randomly generating sets of particles including compensation amounts for the link parameters through particle swarm optimization (PSO), importing the compensation amounts of each of the sets of particles into forward kinematics after addition of the corresponding link parameters, to calculate an adaptive motion trajectory of the end point; calculating position errors between the adaptive motion trajectory and the actual motion trajectory of each of the sets of particles for a fitness value of the PSO to estimate a group best position; and updating the link parameters by the compensation amounts corresponding to the group best position.

14 Claims, 8 Drawing Sheets

(56) References Cited

U.S. PATENT DOCUMENTS

| | | | |
|---|---|---|---|
| 9,833,897 B2 | 12/2017 | Soe-Knudsen et al. | |
| 2008/0285805 A1* | 11/2008 | Luinge | G06F 3/011 |
| | | | 382/128 |
| 2009/0076655 A1* | 3/2009 | Blondel | A61B 34/35 |
| | | | 700/254 |
| 2011/0025562 A1* | 2/2011 | Hol | G01S 5/02585 |
| | | | 342/387 |
| 2013/0096574 A1* | 4/2013 | Kang | A61B 34/30 |
| | | | 606/130 |
| 2014/0114479 A1 | 4/2014 | Okazaki | |
| 2015/0266183 A1* | 9/2015 | Alifragkis | B25J 9/1692 |
| | | | 700/254 |
| 2016/0335790 A1* | 11/2016 | Fleishman | G06T 7/143 |
| 2021/0138656 A1* | 5/2021 | Gothoskar | G06V 20/10 |
| 2022/0268875 A1* | 8/2022 | Szebenyei | G01S 13/74 |

FOREIGN PATENT DOCUMENTS

| | | |
|---|---|---|
| CN | 106078705 | 11/2016 |
| CN | 107478183 | 12/2017 |
| CN | 107498562 | 12/2017 |
| CN | 110405343 | 11/2019 |
| CN | 110561424 | 12/2019 |
| CN | 107255795 | 1/2020 |
| CN | 110900608 | 3/2020 |
| DE | 19930087 | 1/2001 |
| TW | 201223724 | 6/2012 |
| TW | 201736065 | 10/2017 |
| TW | 201924878 | 7/2019 |
| TW | I672206 | 9/2019 |
| WO | 2010003289 | 1/2010 |

OTHER PUBLICATIONS

"Office Action of Taiwan Counterpart Application", dated May 21, 2021, p. 1-p. 12.

Yu, Yue-Qing et al., "Error and compensation of parallel robot with joint clearances", Optics and Precision Engineering, May 2015, with English abstract, pp. 1-9, vol. 23, No. 5.

Huang, Kaiqi et al., "CEOPSO Algorithm for Positioning Error Compensation Control of Rock Drilling Robotic Drilling Arm", Mechanical Science and Technology for Aerospace Engineering, Jul. 2018, with English abstract, pp. 1-8, vol. 37, No. 7.

"Office Action of China Counterpart Application", dated Jun. 20, 2023, p. 1-p. 10.

* cited by examiner

MECHANICAL ARM CALIBRATION SYSTEM AND MECHANICAL ARM CALIBRATION METHOD

CROSS-REFERENCE TO RELATED APPLICATION

This application claims the priority benefit of Taiwan application serial no. 109146442, filed on Dec. 28, 2020. The entirety of the above-mentioned patent application is hereby incorporated by reference herein and made a part of this specification.

TECHNICAL FIELD

The technical field relates to a mechanical arm calibration system and a mechanical arm calibration method.

BACKGROUND

In recent years, mechanical arms are widely used in place of human workers in the automation industry to perform complex and high-precision production and manufacturing procedures. In order to allow continuous and accurate operation of the mechanical arms so as to avoid mistakes and ensure product yield, the industry has high requirements for precision and durability of the mechanical arms.

Generally speaking, every mechanical arm undergoes adjustments before leaving the factory to ensure precision. However, after a long period of operation, mechanical abrasion often causes movement deviations of the mechanical arm or reduces the precision of the mechanical arm. In addition, disassembling during maintenance may also lead to precision deviations. Therefore, the industry is in urgent need for a way to correct a deviation of the mechanical arms on-site (i.e., on a production line), so that the time for transportation to and from the factory for repair can be reduced and that the corrected precision can be ensured within a range required for the manufacturing process.

SUMMARY

One of exemplary embodiments provides a mechanical arm calibration system. The mechanical arm calibration system includes a trajectory tracking device and a processing device. The trajectory tracking device is configured to locate a position of an end point of a mechanical arm having at least one pivot in a three-dimensional space. The processing device includes a connection device, a storage device, and a processor. The connection device is configured to connect the mechanical arm and the trajectory tracking device. The storage device is configured to store a program. The processor is coupled to the connection device and the storage device, and is configured to load and execute the program to: calculate an actual motion trajectory of the end point when the mechanical arm is operating by using the position located by the trajectory tracking device, retrieve multiple link parameters of the mechanical arm, randomly generate multiple sets of particles including multiple compensation amounts of the link parameters through particle swarm optimization (PSO), import the compensation amounts of each of the sets of particles into forward kinematics after addition of the corresponding link parameters, to calculate an adaptive motion trajectory of the end point, calculate multiple position errors between the adaptive motion trajectory and the actual motion trajectory of each of the sets of particles for calculating a fitness value of the PSO to estimate a group best position in the sets of particles, and update the link parameters by the compensation amount of the sets of particles corresponding to the group best position.

One of exemplary embodiments provides a mechanical arm calibration method. The mechanical arm calibration method is adapted for a processing device connected to a trajectory tracking device and includes the following steps. A position of an end point of a mechanical arm having at least one pivot in a three-dimensional space is located by the trajectory tracking device, to calculate an actual motion trajectory of the end point when the mechanical arm is operating. Multiple link parameters of the mechanical arm are retrieved, multiple sets of particles including multiple compensation amounts of the link parameters are randomly generated through particle swarm optimization, and the compensation amounts of each of the sets of particles are imported into forward kinematics after addition of the corresponding link parameters, to calculate an adaptive motion trajectory of the end point. Multiple position errors between the adaptive motion trajectory and the actual motion trajectory of each of the sets of particles are calculated for calculating a fitness value of the particle swarm optimization, to estimate a group best position in the sets of particles. The link parameters are updated by the compensation amount of the particles corresponding to the group best position.

Several exemplary embodiments accompanied with figures are described in detail below to further describe the disclosure in details.

DESCRIPTION OF THE EMBODIMENTS

The disclosure provides a calibration system and a calibration method that can improve operation precision of a mechanical arm. In the calibration method, a trajectory tracking device is installed on the mechanical arm to retrieve an actual motion trajectory of the mechanical arm, and then Denavit-Hartenberg (D-H) parameters (i.e. link/connecting rod parameters to be described later) of the mechanical arm are imported into particle swarm optimization (PSO) for learning after addition of a compensation amount, and further a suitable compensation value of the D-H parameters is obtained by iteration and used for adjustment of the D-H parameters. Accordingly, an adaptive motion trajectory calculated through forward kinematics may be relatively close to the actual motion trajectory, and operation stability and precision of the mechanical arm are thereby improved.

Figure 1:
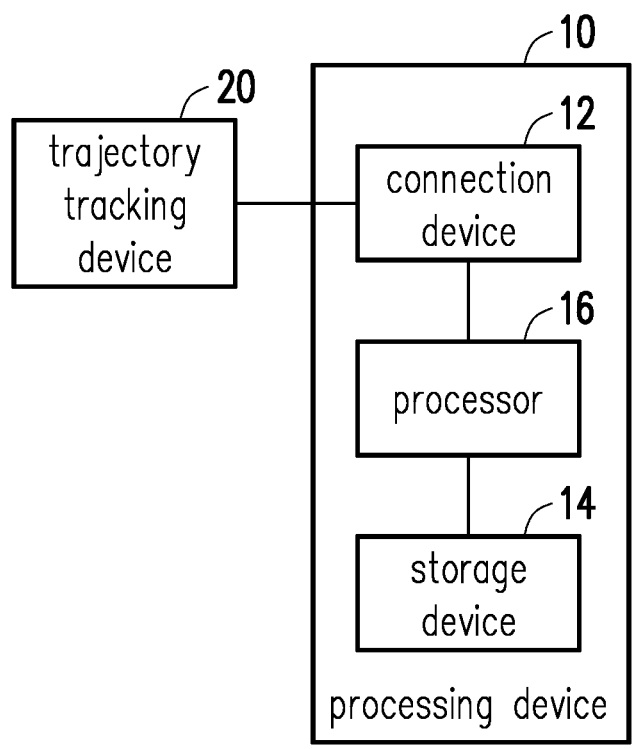
FIG. 1 is a block diagram of a mechanical arm calibration system according to an embodiment of the disclosure.

FIG. 1 is a block diagram of a mechanical arm calibration system according to an embodiment of the disclosure. With reference to FIG. 1, a mechanical arm calibration system 1 of the embodiment includes, for example, a processing device 10 and a trajectory tracking device 20, with the functions thereof described as follows.

The processing device 10 is, for example, a personal computer, a server, a workstation, or other device with computing functions, and includes, for example, a connection device 12, a storage device 14, and a processor 16. The connection device 12 is, for example, a wired or wireless connection device or interface such as a universal serial bus (USB), RS232, Firewire, Thunderbolt, Bluetooth (BT), or wireless fidelity (Wi-Fi), for connecting with and transmitting data to an external device such as a mechanical arm (not shown) and the trajectory tracking device 20. The storage device 14 is, for example, any type of fixed or mobile, random access memory (RAM), read-only memory (ROM), flash memory, hard disk or similar element or a combination of the above elements, and is configured to store a program that may be executed by the processor 16. In some embodiments, the storage device 14, for example, further stores data received by the connection device 12 from the external device. The processor 16 is coupled to the connection device 12 and the storage device 14, and is, for example, a central processing unit (CPU), or other programmable general-purpose or special-purpose microprocessor, a digital signal processor (DSP), a programmable controller, an application specific integrated circuit (ASIC), a programmable logic device (PLD), or other similar device or a combination of these devices, and may load and execute the program stored in the storage device 14, in order to perform the mechanical arm calibration method in the embodiment of the disclosure.

The trajectory tracking device 20 is, for example, installed at an end point of the mechanical arm and configured to locate a position of the end point of the mechanical arm in a three-dimensional space. The trajectory tracking device 20 is, for example, a combination of an inertial measurement unit (IMU) and an ultra-wideband (UWB) positioning device, in which the IMU is used to detect a posture of the trajectory tracking device 20, and the UWB positioning device is used to define a position of the trajectory tracking device 20 in the three-dimensional space.

In some embodiments, the IMU may detect a displacement and an orientation of the end point of the mechanical arm in the three-dimensional space, and the processor 16 of the processing device 10 fuses the displacement and the orientation detected by the IMU to calculate the posture of the trajectory tracking device 20 in the three-dimensional space.

In some embodiments, the UWB positioning device may detect a UWB signal issued from multiple UWB base stations around, and the processor 16 of the processing device 10 estimates a distance between the trajectory tracking device 20 and each of the UWB base stations according to a strength of the UWB signal, and accordingly calculates the position of the trajectory tracking device 20 in the three-dimensional space.

Figure 2:
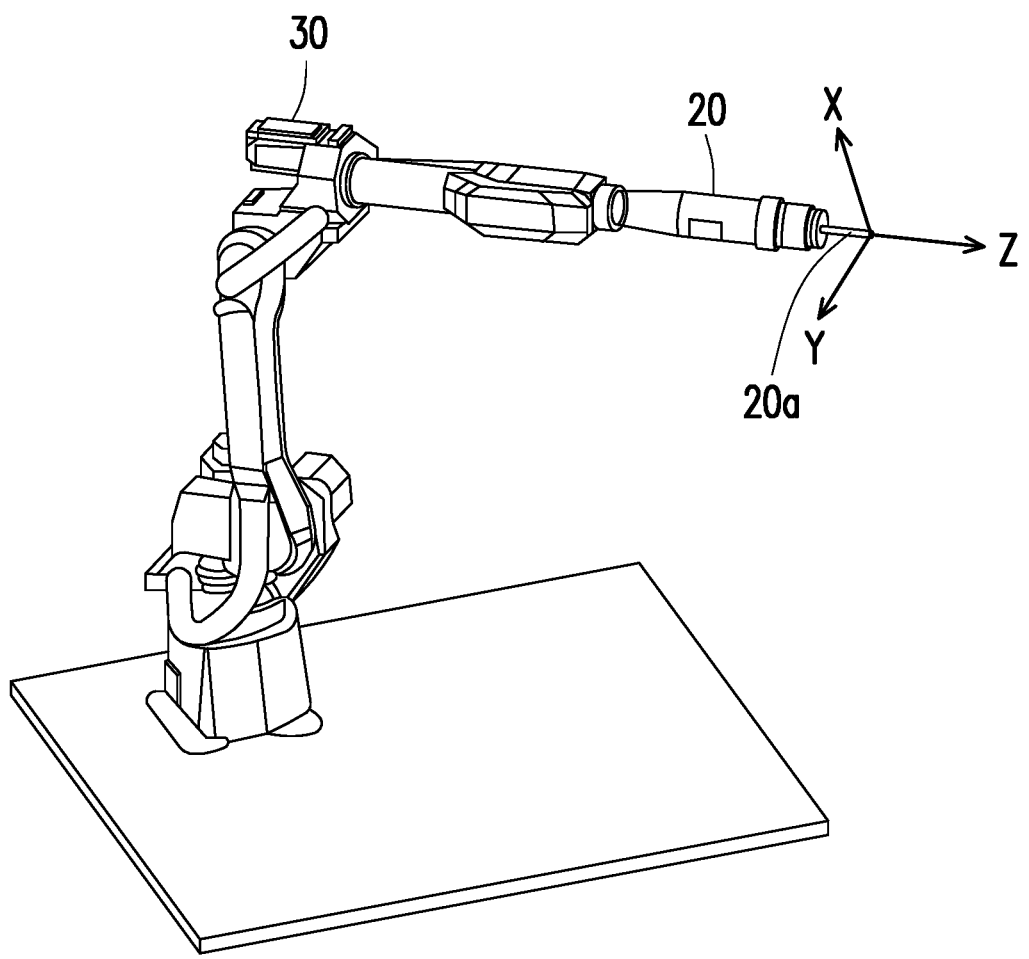
FIG. 2 is a schematic disposition diagram of a trajectory tracking device according to an embodiment of the disclosure.

FIG. 2 is a schematic disposition diagram of a trajectory tracking device according to an embodiment of the disclosure. With reference to FIG. 2, the trajectory tracking device 20 of the embodiment is installed at an end point of a mechanical arm 30, and includes an orientation indicating rod 20a disposed at an end to assist in defining an axial direction (such as a Z-axial direction). The trajectory tracking device 20 is required to be installed on a flange of the mechanical arm 30, errors and deviations generated during an assembling process thereof are required to be calibrated first, and a coordinate system thereof as well as a coordinate system of the mechanical arm 30 are also required to be calibrated.

In some embodiments, for example, a dual-axis infrared sensor (not shown) may be disposed around the trajectory tracking device 20, and a tilt amount and the position of the trajectory tracking device 20 are calculated and calibrated through a calibration algorithm. For example, the mechanical arm 30 may be controlled to move the trajectory tracking device 20 to the middle of the sensor, and positions of two points on an axis may be measured to find a slope for compensating the tilt amount of the trajectory tracking device 20; the mechanical arm 30 may also be controlled to go around a circle, and a center of the circle may be found for compensating a deviation of the position. In addition, a transpose matrix between coordinates of the trajectory tracking device 20 and coordinates of the mechanical arms 30 may be calculated, and tracking of a motion trajectory of the trajectory tracking device 20 is started by setting an initial measurement point to zero.

Figure 3:
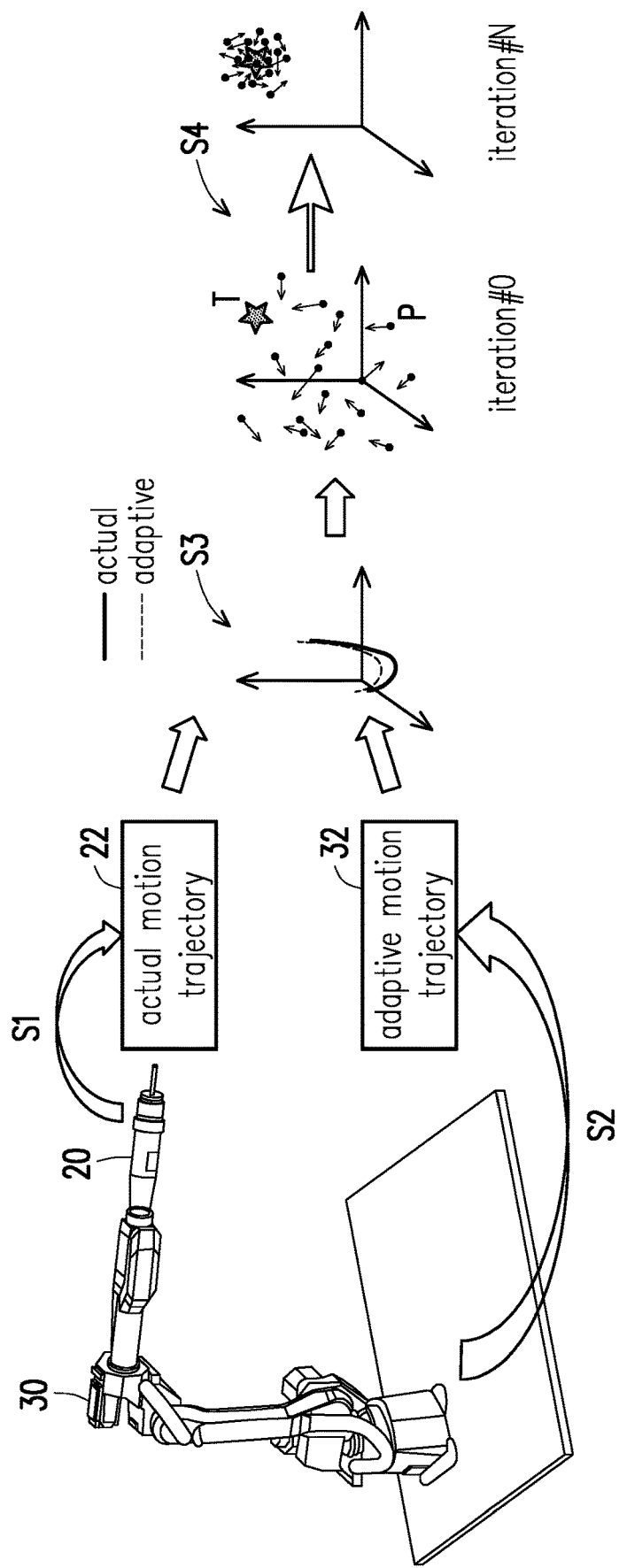
FIG. 3 is a schematic diagram of a mechanical arm calibration method according to an embodiment of the disclosure.

FIG. 3 is a schematic diagram of a mechanical arm calibration method according to an embodiment of the disclosure. With reference to FIG. 1, FIG. 2, and FIG. 3 together, the embodiment conceptually illustrates the mechanical arm calibration method of the disclosure. The mechanical arm 30 is, for example, controlled to move on a predetermined trajectory. Based on a locating result by the trajectory tracking device 20, the processing device 10, for example, calculates an actual motion trajectory 22 of the end point of the mechanical arm 30 in step S1. In step S2, the processing device 10 obtains a joint angle from an encoder of each pivot motor as well as a link/connecting rod twist angle, a link distance, and a link length (i.e. link parameters) of each link of the mechanical arm 30, adds compensation amounts randomly generated through PSO thereto, and then calculates an adaptive motion trajectory 32 of the end point of the mechanical arm 30 through forward kinematics. In step S3, the processing device 10, for example, calculates multiple position errors between the adaptive motion trajectory 22 and the actual motion trajectory 32, and thereby in step S4, imports the calculated position errors into the PSO to iterate the compensation amounts of the link parameters of the mechanical arm 30 (in which each particle Pi may move to a best position near a target position T through iteration). Finally, by updating the link parameters using the compensation amounts, task trajectory precision of the mechanical arm 30 is improved.

Figure 4:
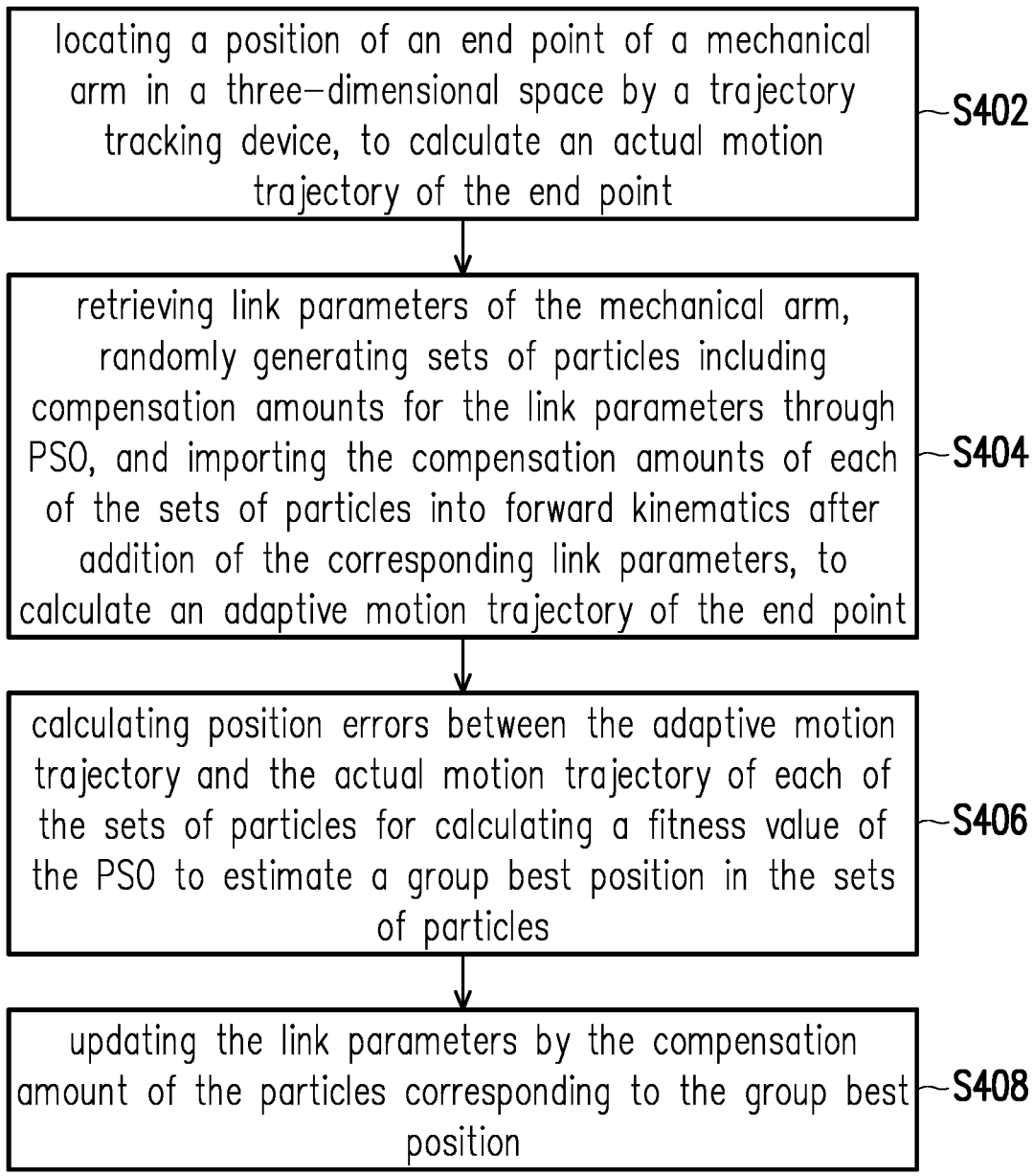
FIG. 4 is a flowchart of a mechanical arm calibration method according to an embodiment of the disclosure.

FIG. 4 is a flowchart of a mechanical arm calibration method according to an embodiment of the disclosure. With reference to FIG. 1, FIG. 3, and FIG. 4 together, the method of the embodiment is suitable for the mechanical arm calibration system 1. Detailed steps of the mechanical arm calibration method of the embodiment are described as follows with reference to the devices or elements of the mechanical arm calibration system 1.

In step S402, by the processor 16 of the processing device 10, the position of the end point of the mechanical arm 30 in the three-dimensional space is located by the trajectory tracking device 20, to calculate the actual motion trajectory 22 when the mechanical arm 30 is operating.

In some embodiments, the trajectory tracking device 20 acquires the actual motion trajectory 22 of the end point of the mechanical arm 30 by combining the IMU and the UWB positioning device. The IMU is, for example, a combination of a three-axis accelerometer, a three-axis gyroscope, and a three-axis magnetometer, and may detect the displacement and the orientation of the end point of the mechanical arm 30 in the three-dimensional space. Also, the displacement and the orientation detected by the IMU may be fused by a sensor fusion technology, thereby calculating the posture of the trajectory tracking device 20 in the three-dimensional space. The accelerometer may obtain from a force condition sensed in each axial direction the magnitude and direction of acceleration in the axial direction and accordingly calculates the displacement. The gyroscope is configured to measure an included angle between a three-dimensional coordinate system and the sensor for calculating an angular velocity, and may also measure its own rotational motion by determining a motion state of an object in the three-dimensional space through the included angle and the angular velocity. The magnetometer is configured to measure included angles of a current apparatus in four directions of north, east, south, and west, so as to acquire an actual orientation.

Based on the UWB signals issued by several UWB base stations, the UWB positioning device may calculate its position relative to each of the UWB base stations, thereby inferring the position of the trajectory tracking device. UWB wireless communication is performed in pulses at very short intervals (of less than 1 nanosecond), and has strong penetration, low power consumption, good anti-multipath performance, reduced hazards to human health, high safety, and accurate positioning. A UWB positioning technique adopts a time difference of arrival (TDOA) positioning algorithm, in which UWB base stations are disposed indoors in known positions, and a positioning label is disposed on an apparatus to be located. The label may transmit pulses at a certain frequency, and distances between the label and the UWB base stations in known positions are continuously measured. The positioning is performed by measuring transmission delay differences between the different UWB base stations and a mobile terminal, so that a position of the positioning label can be accurately calculated through the positioning algorithm.

Figure 5:
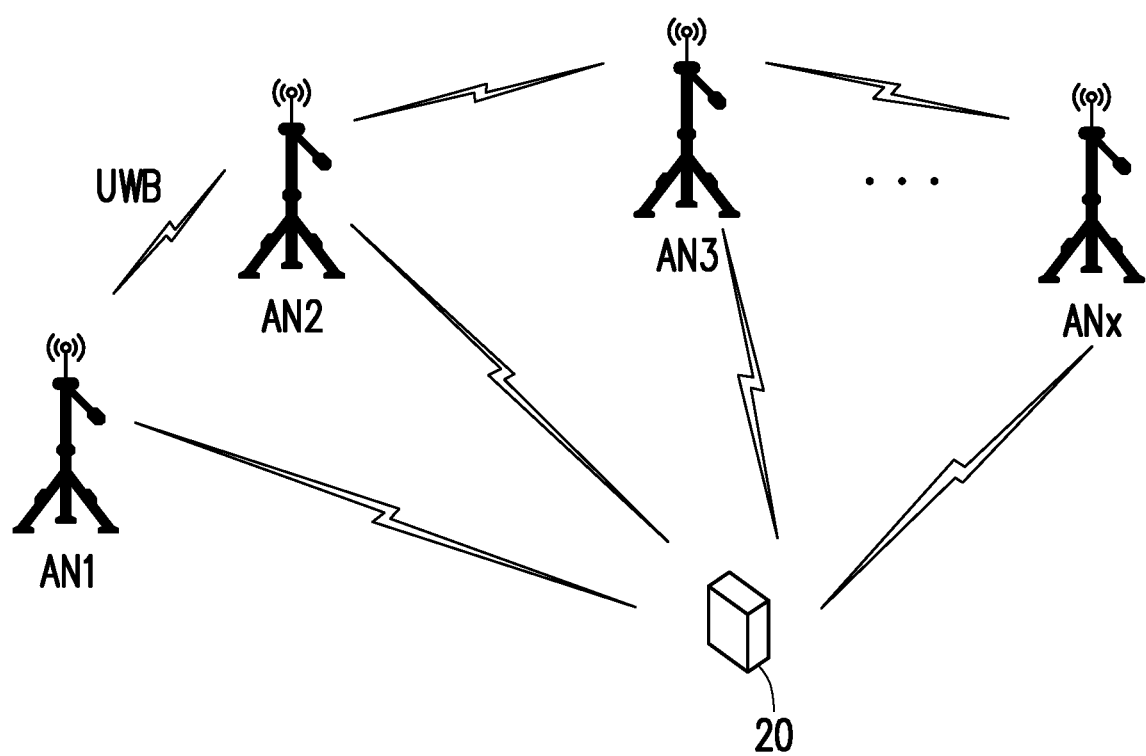
FIG. 5 is a schematic diagram of an ultra-wideband positioning technique according to an embodiment of the disclosure.

For example, FIG. 5 is a schematic diagram of a UWB positioning technique according to an embodiment of the disclosure. With reference to FIG. 5, in the embodiment, for example, multiple UWB base stations AN1 to ANx (in which x is a positive integer) are disposed around the trajectory tracking device 20. The UWB positioning device on the trajectory tracking device 20 may detect a UWB signal (labeled as UWB in FIG. 5) issued by the UWB base stations AN1 to ANx, estimate the distance between the trajectory tracking device 20 and each of the UWB base stations AN1 to ANx according to the strength of the UWB signal, and accordingly calculate the position of the trajectory tracking device 20 in the three-dimensional space. The position of the trajectory tracking device 20 can be converted into the position of the end point of the mechanical arm 30 through the transpose matrix between the coordinates of the trajectory tracking device 20 and the coordinates of the mechanical arm 30 calculated in the previous embodiment.

Figure 6:
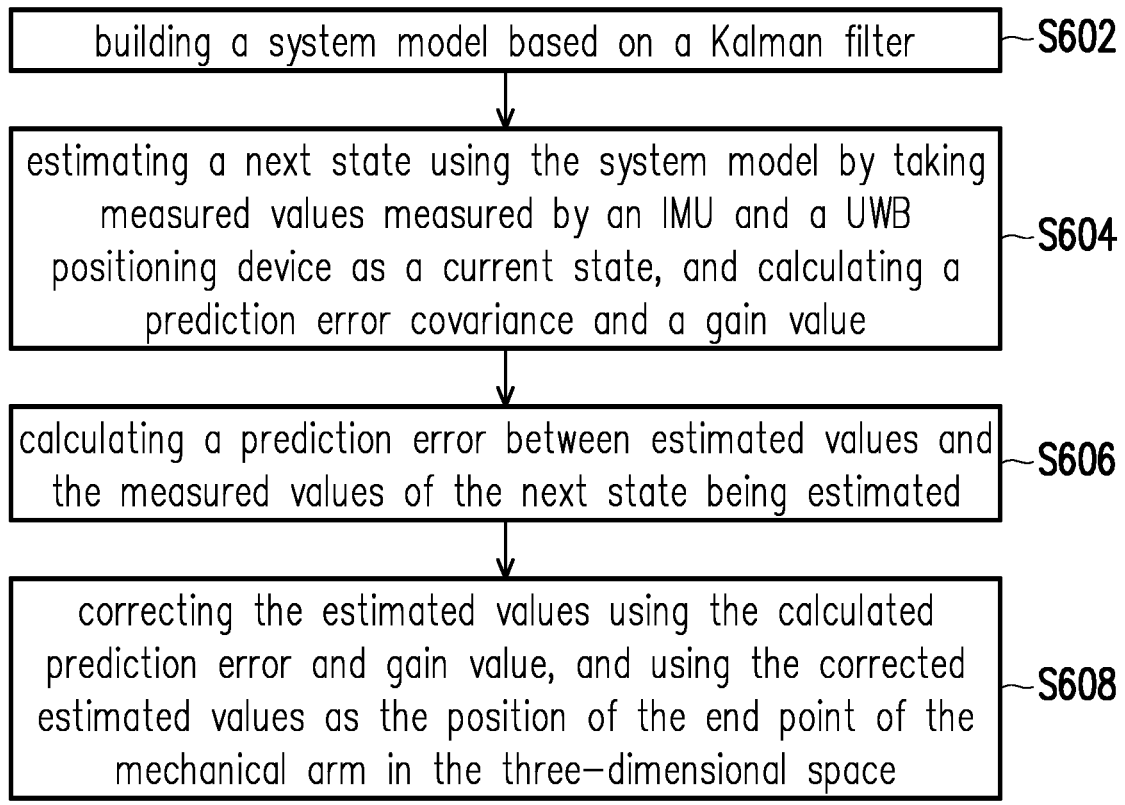
FIG. 6 is a flowchart of a calculation method of a mechanical arm motion trajectory according to an embodiment of the disclosure.

FIG. 6 is a flowchart of a calculation method of a mechanical arm motion trajectory according to an embodiment of the disclosure. With reference to both FIG. 1 and FIG. 6, the embodiment describes how the trajectory tracking device 20 combines the IMU and the UWB positioning device to acquire the actual motion trajectory of the end point of the mechanical arm. Detailed steps of the mechanical arm calibration method of the embodiment are described as follows with reference to the devices or elements of the mechanical arm calibration system 1.

In step S602, by the processor 16 of the processing device 10, a system model based on a Kalman filter is built. The system model, for example, denotes a motion state and an observed measurement state of the mechanical arm in the three-dimensional space.

For example, if a system state is $x \in R^n$ and the observable measurement state is $z \in R^m$, in which m and n are spatial dimensions and usually expressed as positive integers, then the system model of the mechanical arm may be expressed as:

$$x_k = Fx_{k-1} + Bu_{k-1} + W_{k-1}$$

$$z_k = Hx_k + v_k$$

In the above, the label F is a n×n matrix that denotes a system without process noises and control inputs and connects the system states at a previous time k−1 and at a current time k. The label B is a n×1 matrix that denotes a direction in which a control input $u \in R^1$ enters the system. The label H is a m×n matrix that maps a system state x to a measurement state z. The labels w and v are process noise and measurement noise respectively. If the noises are from mutually independent sources and conform to a zero-mean normal distribution, their corresponding covariance matrices are Q (covariance matrix) and R (covariance matrix of observation noise).

In step S604, by the processor 16, a next state $x_{k+1}$ (in which $x_{k+1} = Fx_k$ and stands for the position of the end point of the mechanical arm in the three-dimensional space at a next time) is estimated by the system model by taking multiple measured values measured by the IMU and the UWB positioning device as a current state $x_k$ (a current position of the end point of the mechanical arm in the three-dimensional space), and a prediction error covariance $P_{k+1}$ (noise prediction at the next time) and a gain value $K_{k+1}$ (Kalman gain at the next time) are calculated with equations below:

$$P_{k+1} = FP_{k+1} F^T + Q$$

$$S_{k+1} = R + HP_{k+1} H^T$$

$$K_{k+1} = \frac{P_{k+1} H^T}{S_{k+1}}$$

In the above, the label $S_{k+1}$ is a covariance of measurement residual.

In step S606, by the processor 16, an estimated prediction error $\varepsilon_{k+1}$ between multiple measured values $z_{k+1}$ and estimated values $\hat{z}_{k+1}$ of the next state is calculated with an equation below:

$$\varepsilon_{k+1} = z_{k+1} - \hat{z}_{k+1}$$
$$= z_{k+1} - Hx_{k+1}$$
$$= z_{k+1} - H(Fx_k + Bu_k)$$

In step S608, by the processor 16, the estimated value $x_{k+1}$ is corrected using the calculated prediction error $\varepsilon_{k+1}$ and gain value $K_{k+1}$, thereby obtaining a corrected estimated value $x_{k+1}'$ as the location of the end point of the mechanical arm in the three-dimensional space. The equation thereof is as follows:

$$x_{k+1}'=x_{k+1}+K_{k+1}\varepsilon_{k+1}$$

In some embodiments, the gain value $K_{k+1}$ and the covariance $S_{k+1}$ may be used to update the prediction error covariance $P_{k+1}$. By repeating steps S604 to S608, the processor 16 may continuously predict the position of the end point of the mechanical arm in the next state, and generate the actual motion trajectory of the end point of the mechanical arm using the predicted positions. The actual motion trajectory may be compared with an adaptive motion trajectory (to be described later) calculated through the forward kinematics, and an error therebetween is calculated. Finally, by importing the error into PSO, the compensation amounts of the link parameters of the mechanical arm 30 are obtained. An equation for updating the prediction error covariance $P_{k+1}$ is as follows:

$$P_{k+1}'=P_{k+1}+K_{k+1}S_{k+1}P_{k+1}^T$$

Returning to the flow of FIG. 4, in step S404, by the processor 16, multiple link parameters of the mechanical arm 30 are retrieved, multiple sets of particles including multiple compensation amounts of these link parameters are randomly generated through PSO, and the compensation amounts of each of the sets of particles are imported into the forward kinematics after addition of the corresponding link parameters, to calculate the adaptive motion trajectory of the end point.

Figure 7:
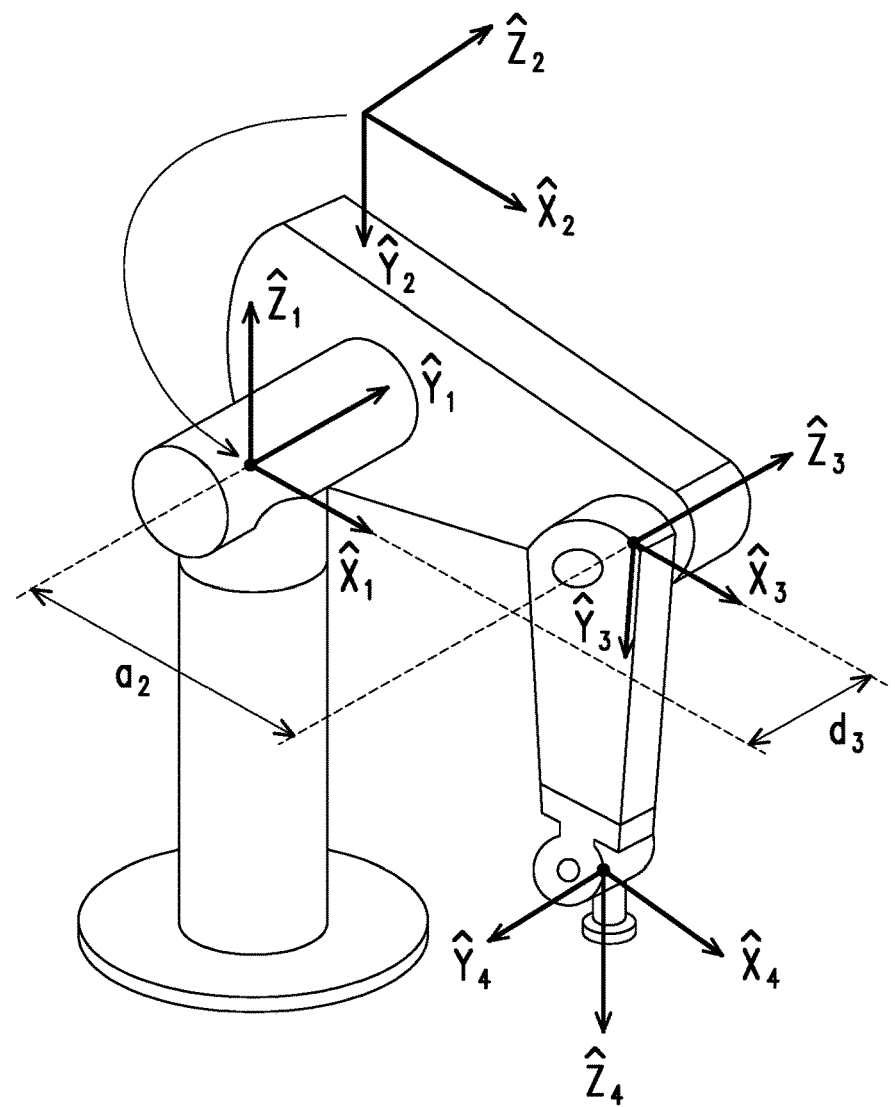
FIG. 7 is an example of generating compensation amounts of link parameters according to an embodiment of the disclosure.
Figure 7:
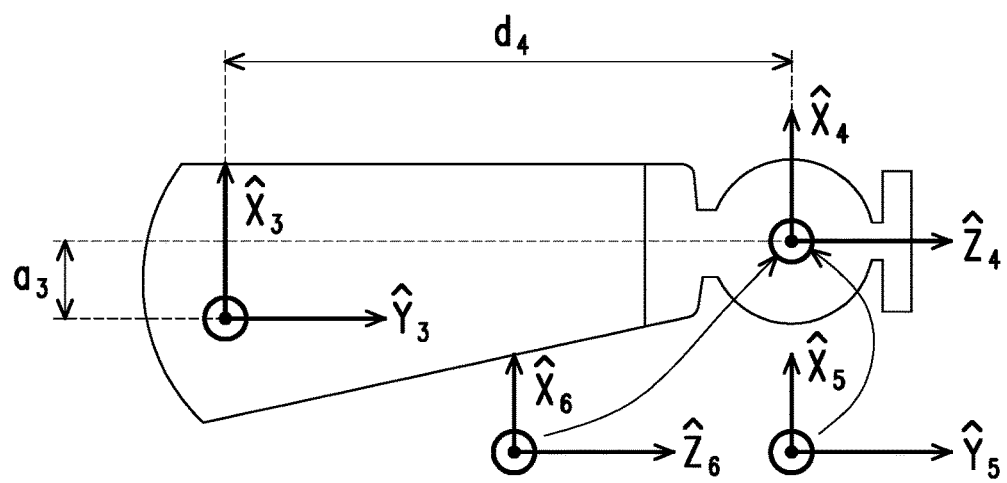

For example, FIG. 7 is an example of generating compensation amounts of link parameters according to an embodiment of the disclosure. With reference to FIG. 7, a mechanical arm 70 of the embodiment has six pivots, and a motion posture of the mechanical arm 70 is changed through rotation of the pivots. $\hat{X}_1$, $\hat{Y}_1$, $\hat{Z}_1$ denote coordinate axis directions of a first axis, $\hat{X}_2$, $\hat{Y}_2$, $\hat{Z}_2$ denote coordinate axis directions of a second axis, and so on. Table 1 below shows D-H parameters of the mechanical arm 70, including link twist angle $\alpha_{i-1}$, link length $a_{i-1}$, link distance $d_i$, and joint angle $\theta_i$. In the embodiment, the particles including the following ten compensation amounts $\partial_1$ to $\partial_{10}$ are randomly generated through PSO, and the compensation amounts $\partial_1$ to $\partial_{10}$ are imported into the forward kinematics after addition of the corresponding link parameters, to calculate the adaptive motion trajectory of the end point of the mechanical arm 70.

TABLE 1

| i | $\alpha_{i-1}$ | $a_{i-1}$ | $d_i$ | $\theta_i$ |
|---|---|---|---|---|
| 1 | 0° + $\partial_1$ | 0 | 0 | $\theta_1$ |
| 2 | −90° + $\partial_2$ | 0 | 0 | $\theta_2$ |
| 3 | 0° + $\partial_3$ | $a_2 + \partial_7$ | $d_3 + \partial_9$ | $\theta_3$ |
| 4 | −90° + $\partial_4$ | $a_3 + \partial_8$ | $d_4 + \partial_{10}$ | $\theta_4$ |
| 5 | 90° + $\partial_5$ | 0 | 0 | $\theta_5$ |
| 6 | −90° + $\partial_6$ | 0 | 0 | $\theta_6$ |

Specifically, in the forward kinematics, a space conversion matrix $A_i$ (in which i=1 to 6) of each axis of the mechanical arm 70 can be calculated with an equation below:

$$A_i = \begin{bmatrix} \cos\theta_i & -\sin\theta_i\cos\alpha_i & \sin\theta_i\sin\alpha_i & a_i\cos\theta_i \\ \sin\theta_i & \cos\theta_i\cos\alpha_i & -\cos\theta_i\sin\alpha_i & a_i\sin\theta_i \\ 0 & \sin\alpha_i & \cos\alpha_i & d_i \\ 0 & 0 & 0 & 1 \end{bmatrix}$$

Accordingly, the position T of the end point of the mechanical arm 70 can be calculated with an equation below:

$$T=A_1 \cdot A_2 \cdot A_3 \cdot A_4 \cdot A_5 \cdot A_6$$

The adaptive motion trajectory of the end point of the mechanical arm 70 can be generated by continuously calculating the position T of the end point of the mechanical arm 70.

It should be noted that, in the embodiment, ten compensation amounts, i.e., $\partial_1$ to $\partial_{10}$, are generated corresponding to the mechanical arm 70. However in other embodiments, for other types of mechanical arms, different numbers of compensation amounts may be set for the link parameters of the mechanical arms according to actual needs. The embodiment does not limit the number and setting of the compensation amounts.

In step S406, by the processor 16, multiple position errors between the adaptive motion trajectory and the actual motion trajectory (for example, the actual motion trajectory calculated in the previous embodiment of FIG. 6) of each of the sets of particles are calculated for calculating a fitness value of the PSO, to estimate a group best position in the sets of particles. The processor 16 may, for example, calculate a root mean square value of the position errors of each of the sets of particles as the fitness value. However, the disclosure is not limited thereto.

In detail, in the PSO, massless particles are designed to simulate birds in a flock. These particles have no other properties than velocity and position, in which the velocity denotes a speed of movement, and the position denotes a direction of movement. Each particle has a fitness value determined by a target function. Moreover, in each particle, a best position (pbest) each particle has experienced so far and a current position of the particle are recorded, and this record may be regarded as the particle's own flying experience. In addition, in each particle, a best position (gbest, i.e., a best value among all the pbest values) all the particles in the whole group have experienced so far is also recorded, and this record may be regarded as experience of the particle's companions. In the PSO, each of the particles determines a next motion through the experience of themselves and their companions.

Figure 8:
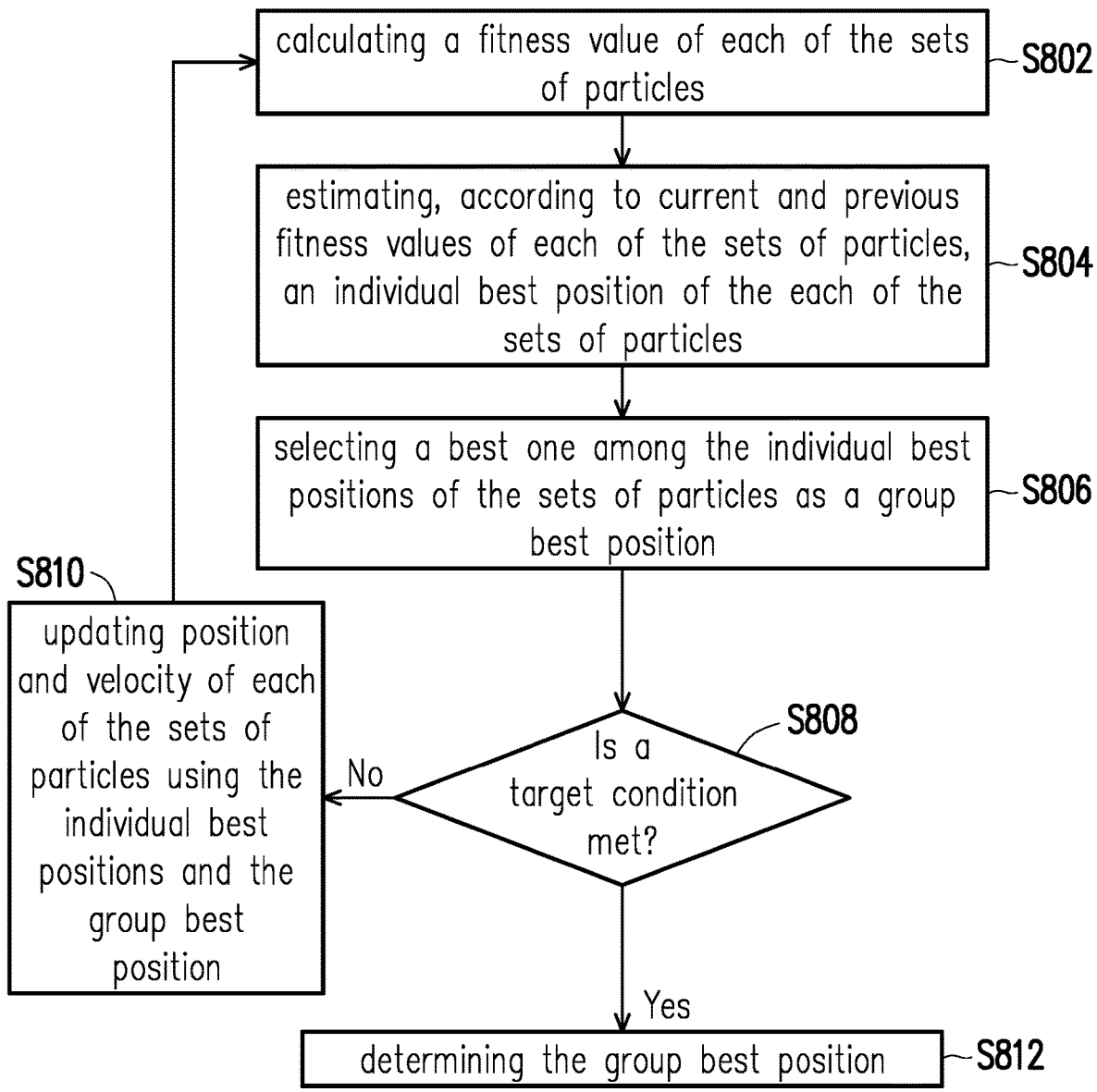
FIG. 8 is a flowchart of a mechanical arm calibration method according to an embodiment of the disclosure.

FIG. 8 is a flowchart of a mechanical arm calibration method according to an embodiment of the disclosure. With reference to both FIG. 1 and FIG. 8, the method of the embodiment is suitable for the mechanical arm calibration system 1. Detailed steps of the mechanical arm calibration method of the embodiment are described as follows with reference to the devices or elements of the mechanical arm calibration system 1.

In step S802, by the processor 16 of the processing device 10, a current fitness value of each of the sets of particles is calculated. For example, it is assumed that a label q is a link parameter retrieved during a motion of a mechanical arm, a label X is an actual position obtained through the above computation by the Kalman filter, and the link parameter q is input to a function $f$ of the forward kinematics to obtain an adaptive position $f(q)$. Assuming that a mechanical arm motion trajectory includes 1000 pieces of data, the processor 16, for example, generates 50 sets of particles, and each of the particles includes the ten compensation items $\partial_1$ to $\partial_{10}$, then 1000 adaptive positions $f(q)$ can be calculated by using a first set of the particles, and position errors E (E=X−$f(q)$) between the actual positions X and the adaptive positions $f(q)$ can further be calculated. The processor 16 calculates a root mean square value RMSE of the 1000 pieces of the position errors as the fitness value of the set of particles. An equation for calculating the root mean square value RMSE of a nth set of particles is as follows:

$$RMSE = \sqrt{\frac{E_1^n + E_2^n + \ldots + E_k^n}{N}}$$

In the above, k denotes number of pieces of data, and N denotes number of times of iteration. In the same way, 50 sets of the fitness values can be generated for the 50 sets of particles.

In step S804, by the processor 16, according to the current and previous fitness values of each of the sets of particles, an individual best position (pbest) of the set of particles is estimated. In some embodiments, the processor 16, for example, selects the particle having a smallest fitness value as the individual best position.

In step S806, by the processor 16, a best one among the individual best positions of the sets of particles is selected as a group best position. For example, from among the individual best positions (pbest) of the above 50 sets of particles, a best solution (for example, a Min(RMSE) having the smallest fitness value) is selected as the group best position (gbest).

In step S808, by the processor 16, whether a target condition is met is determined. The target condition is, for example, the calculated fitness value being smaller than a predetermined threshold or the number of times of iteration reaching a predetermined number of times (for example, any value from 100 to 1000).

If the target condition is not met, in step S810, by the processor 16, position and velocity of each of the sets of particles are updated using the individual best positions and the group best position. Then, the process returns to step S802 and the fitness value of each of the sets of particles is calculated again.

For example, the processor 16 may update a current position P(k) and a current velocity V(k) of each of the sets of particles into a position P(k+1) and a velocity V(k+1) with calculation equations below:

$V(k+1) = wV(k) + c_1 \text{rand}(\ ) \cdot (pbest - P(k)) + c_2 \text{Rand}(\ ) \cdot (gbest - P(k))$ $P(k+1) = P(k) + V(k+1)$ In the above, w is an inertia weight, the label $c_1$ is an individual experience weight, the label $c_2$ is a group experience weight, and the labels rand( ) and Rand( ) are two random values in a range of [0,1].

The processor 16 repeats the above steps S802 to S810 until the target condition is met, and enters step S812 to finally determine the group best position. The group best position may be used as the group best position estimated by the processor 16 in the above step S406.

Finally, in step S408, by the processor 16, the link parameters are updated by the compensation amount of the particle corresponding to the group best position. That is, the processor 16 may add a best compensation amount calculated by the PSO to each of the D-H parameters in a D-H parameter table of the mechanical arm, and thereby update the D-H parameter table. When receiving a task command, the mechanical arm may perform an operation with reference to the updated D-H parameter table. In this way, the task trajectory precision of the mechanical arm can be improved.

In summary, in the mechanical arm calibration system and the mechanical arm calibration method of the disclosure, by fusion of signals of the IMU and the UWB positioning device using the trajectory tracking device installed on the mechanical arm, the actual motion trajectory of the end point is calculated. The actual motion trajectory is compared with the adaptive motion trajectory calculated by forward kinematic equations through parameter values of each pivot motor of the mechanical arm, and an error amount between the two is calculated. Then, the error amount is used to calculate the compensation amounts of the D-H parameters of the mechanical arm through robust PSO so as to update the D-H parameters. In this way, the errors accumulated in the long-term motion of the mechanical arm can be corrected, and the trajectory precision can be improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A mechanical arm calibration system, comprising:
a trajectory tracking device, locating a position of an end point of a mechanical arm having at least one pivot in a three-dimensional space; and
a processing device, comprising:
a connection device, connecting the mechanical arm and the trajectory tracking device;
a storage device, storing a program; and
a processor, coupled to the connection device and the storage device, and configured to load and execute the program to:
calculate an actual motion trajectory of the end point when the mechanical arm is operating by using the position located by the trajectory tracking device;
retrieve a plurality of link parameters of the mechanical arm, randomly generate a plurality of sets of particles comprising a plurality of compensation amounts for the link parameters through particle swarm optimization, import the compensation amounts of each of the sets of particles into forward kinematics after addition of the corresponding link parameters, to calculate an adaptive motion trajectory of the end point;
calculate a plurality of position errors between the adaptive motion trajectory and the actual motion trajectory of each of the sets of particles for calculating a fitness value of the particle swarm optimization, to estimate a group best position in the sets of particles; and
update the link parameters by the compensation amount of the particles corresponding to the group best position, wherein
the trajectory tracking device comprises:
an inertial measurement unit, detecting a displacement and an orientation of the end point of the mechanical arm in the three-dimensional space; and
an ultra-wideband positioning device, detecting an ultra-wideband signal issued from a plurality of ultra-wideband base stations around, and wherein
the processor is further configured to:
fuse the displacement and the orientation detected by the inertial measurement unit, to calculate a posture of the trajectory tracking device in the three-dimensional space;
estimate a distance between the trajectory tracking device and each of the ultra-wideband base stations according to a strength of the ultra-wideband signal, and accordingly calculate a position of the trajectory tracking device in the three-dimensional space;

build a system model based on a Kalman filter, the system model denoting a motion state and an observed measurement state of the mechanical arm in the three-dimensional space;

estimate a next state using the system model by taking a plurality of measured values measured by the inertial measurement unit and the ultra-wideband positioning device as a current state, and calculate a prediction error covariance and a gain value;

calculate a prediction error between a plurality of estimated values and the measured values of the next state being estimated; and correct the estimated values using the calculated prediction error and gain value, and use the corrected estimated values as the position of the end point of the mechanical arm in the three-dimensional space.

2. The mechanical arm calibration system according to claim 1, wherein the inertial measurement unit comprises a three-axis accelerometer, a three-axis gyroscope, and a three-axis magnetometer.

3. The mechanical arm calibration system according to claim 1, wherein the processor is configured to calculate a root mean square value of the position errors of each of the sets of particles as the fitness value.

4. The mechanical arm calibration system according to claim 1, wherein the processor is configured to:
randomly generate a position and a velocity of each set of particles.

5. The mechanical arm calibration system according to claim 4, wherein the processor is configured to:
calculate the fitness value of each of the sets of particles at a current time, and compare the fitness value at the current time with the fitness value at a previous time, to estimate an individual best position of the set of particles;

select a best one among the individual best positions of the sets of particles as the group best position; and update the position and the velocity of each of the particles using the individual best positions and the group best position, repeat the above steps until a target condition is met, and determine the group best position.

6. The mechanical arm calibration system according to claim 5, wherein the target condition comprises the fitness value being smaller than a predetermined threshold or a number of times of iteration reaching a predetermined number of times.

7. The mechanical arm calibration system according to claim 1, wherein the link parameters comprise a joint angle, a link twist angle, a link distance, and a link length.

8. A mechanical arm calibration method, adapted for a processing device connected to a trajectory tracking device, the mechanical arm calibration method comprising:
locating a position of an end point of a mechanical arm having at least one pivot in a three-dimensional space by the trajectory tracking device, to calculate an actual motion trajectory of the end point when the mechanical arm is operating;

retrieving a plurality of link parameters of the mechanical arm, randomly generating a plurality of sets of particles comprising a plurality of compensation amounts of the link parameters through particle swarm optimization, importing the compensation amounts of each of the sets of particles into forward kinematics after addition of the corresponding link parameters, to calculate an adaptive motion trajectory of the end point, calculating a plurality of position errors between the adaptive motion trajectory and the actual motion trajectory of each of the sets of particles for calculating a fitness value of the particle swarm optimization, to estimate a group best position in the sets of particles;

updating the link parameters by the compensation amount of the particles corresponding to the group best position; and controlling the mechanical arm based on the updated link parameters, wherein the trajectory tracking device comprises an inertial measurement unit configured to detect a displacement and an orientation of the end point of the mechanical arm in the three-dimensional space, and an ultra-wideband positioning device configured to detect an ultra-wideband signal issued from a plurality of ultra-wideband base stations around, and the locating the position of the end point of the mechanical arm having at least one pivot in the three-dimensional space by the trajectory tracking device comprises:

fusing the detected displacement and orientation to calculate a posture of the trajectory tracking device in the three-dimensional space;

estimating a distance between the trajectory tracking device and each of the ultra-wideband base stations according to a strength of the ultra-wideband signal, and accordingly calculating a position of the trajectory tracking device in the three-dimensional space;

building a system model based on a Kalman filter, the system model denoting a motion state and an observed measurement state of the mechanical arm in the three-dimensional space;

estimating a next state using the system model by taking a plurality of measured values measured by the inertial measurement unit and the ultra-wideband positioning device as a current state, and calculating a prediction error covariance and a gain value;

calculating a prediction error between a plurality of estimated values and the measured values of the next state being estimated; and correcting the estimated values using the calculated prediction error and gain value, and using the corrected estimated values as the position of the end point of the mechanical arm in the three-dimensional space.

9. The mechanical arm calibration method according to claim 8, wherein the inertial measurement unit comprises a three-axis accelerometer, a three-axis gyroscope, and a three-axis magnetometer.

10. The mechanical arm calibration method according to claim 8, wherein the calculating the position errors of each of the sets of particles for calculating the fitness value of the particle swarm optimization comprises calculating a root mean square value of the position errors of each of the sets of particles as the fitness value.

11. The mechanical arm calibration method according to claim 8, wherein the randomly generating the sets of particles comprising the compensation amounts of the link parameters through the particle swarm optimization comprises:
randomly generating a position and a velocity of each of the sets of particles.

12. The mechanical arm calibration method according to claim 11, wherein the calculating the position errors of each of the sets of particles for calculating the fitness value of the particle swarm optimization to estimate the group best position comprises:

calculating the fitness value of each of the sets of particles at a current time and comparing the fitness value at the current time with the fitness value at a previous time, to estimate an individual best position of the set of particles;

selecting a best one among the individual best positions of the sets of particles as the group best position; and updating the position and the velocity of each of the particles using the individual best positions and the group best position, repeating the above steps until a target condition is met, and determining the group best position.

13. The mechanical arm calibration method according to claim 12, wherein the target condition comprises the fitness value being smaller than a predetermined threshold or a number of times of iteration reaching a predetermined number of times.

14. The mechanical arm calibration method according to claim 8, wherein the link parameters comprise a joint angle, a link twist angle, a link distance, and a link length.

\* \* \* \* \*